United States Patent
Horaguchi et al.

(10) Patent No.: US 9,057,430 B2
(45) Date of Patent: Jun. 16, 2015

(54) FOUR-WHEEL DRIVE VEHICLE (75) Inventors: Masahiro Horaguchi, Okazaki (JP);
Akihiro Ohno, Okazaki (JP); Hiroshi Takuno, Nukata-gun (JP); Takashi Hosokawa, Takahama (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 13/878,047

(22) PCT Filed: Sep. 13, 2011

(86) PCT No.: PCT/JP2011/070786
§ 371 (c)(1),
(2), (4) Date: Jul. 1, 2013

(87) PCT Pub. No.: WO2012/046544
PCT Pub. Date: Apr. 12, 2012

(65) Prior Publication Data
US 2013/0274055 A1 Oct. 17, 2013

(30) Foreign Application Priority Data
Oct. 5, 2010 (JP) ................................. 2010-225904

(51) Int. Cl.
*B60K 17/35* (2006.01)
*F16H 48/05* (2012.01)
*B60K 23/08* (2006.01)

(52) U.S. Cl.
CPC ........... *F16H 48/05* (2013.01); *Y10T 74/19074* (2015.01); *B60K 17/3515* (2013.01); *B60K 23/0808* (2013.01)

(58) Field of Classification Search
CPC .............................. B60K 17/346; B60K 17/35
USPC .................. 180/233, 245–248; 475/231, 249
See application file for complete search history.

(56) References Cited

U.S. PATENT DOCUMENTS 2,721,639 A * 10/1955 Miller .......................... 192/54.5
4,895,217 A * 1/1990 Hueckler et al. .............. 180/233
(Continued)

FOREIGN PATENT DOCUMENTS

CN 86 1 02357 A 10/1986
CN 1911700 A 2/2007
(Continued)

OTHER PUBLICATIONS

International Search Report Issued Nov. 22, 2011 in PCT/JP11/70786 Filed Sep. 13, 2011.
(Continued)

*Primary Examiner* — Joseph Rocca
*Assistant Examiner* — Gabriela C Craciun
(74) *Attorney, Agent, or Firm* — Oblon, McClelland, Maier & Neustadt, L.L.P.

(57) ABSTRACT

A four-wheel drive vehicle includes: a driving force transmission system which transmits torque of a drive source to front wheels and rear wheels via gear mechanisms; a clutch provided in the driving force transmission system and capable of controlling an amount of the torque transmitted to the rear wheels; and a pressing mechanism which presses the clutch by transforming a part of the torque transmitted to the rear wheels into axial thrust. In the driving force transmission system, gear ratios of the gear mechanisms are set such that a direction of a differential rotation between a drive shaft connected to an input side of the clutch and a drive shaft connected to an output side of the clutch is not reversed even when a steered angle of the front wheels changes to a maximum value while the four-wheel drive vehicle is traveling forwards.

7 Claims, 5 Drawing Sheets

(56) References Cited

U.S. PATENT DOCUMENTS

| | | | |
|---|---|---|---|
| 5,234,072 A * | 8/1993 | Chludek | 180/248 |
| 5,366,421 A * | 11/1994 | Hirota | 475/231 |
| 5,890,989 A * | 4/1999 | Yamazaki et al. | 475/295 |
| 6,105,703 A | 8/2000 | Kuroda et al. | |
| 6,135,229 A * | 10/2000 | Arimatsu | 180/248 |
| 6,878,085 B2 * | 4/2005 | Matsuno | 475/254 |
| 7,386,383 B2 * | 6/2008 | Yoneda et al. | 701/69 |
| 7,392,875 B2 * | 7/2008 | Matsuzaki | 180/247 |
| 7,510,041 B2 * | 3/2009 | Bowen | 180/248 |
| 7,600,598 B2 * | 10/2009 | Perakes et al. | 180/248 |
| 8,157,703 B2 * | 4/2012 | Saito | 477/83 |
| 8,256,559 B2 * | 9/2012 | Kato et al. | 180/248 |
| 8,620,546 B2 * | 12/2013 | Kobayashi et al. | 701/69 |
| 2002/0003057 A1 * | 1/2002 | Mori et al. | 180/248 |
| 2005/0023063 A1 * | 2/2005 | Mueller | 180/248 |
| 2005/0103552 A1 * | 5/2005 | Ohno et al. | 180/248 |
| 2006/0054373 A1 * | 3/2006 | Mueller | 180/247 |
| 2009/0120707 A1 * | 5/2009 | Yoneda | 180/248 |
| 2009/0187319 A1 * | 7/2009 | Mori | 701/69 |
| 2010/0094519 A1 * | 4/2010 | Quehenberger et al. | 701/69 |

FOREIGN PATENT DOCUMENTS

| | | | | |
|---|---|---|---|---|
| CN | 101280839 A | | 10/2008 | |
| JP | 11 125279 | | 5/1999 | |
| JP | 2002 370557 | | 12/2002 | |
| JP | 2002370557 A | * | 12/2002 | B60K 17/344 |
| JP | 2006 242364 | | 9/2006 | |
| JP | 2009 264518 | | 11/2009 | |
| JP | 2010 100280 | | 5/2010 | |

OTHER PUBLICATIONS

Chinese Office Action issued on Mar. 23, 2015, in Chinese Patent Application No. 201180048563.2 (with English translation).

* cited by examiner

FOUR-WHEEL DRIVE VEHICLE

TECHNICAL FIELD

The present invention relates to a four-wheel drive vehicle including a driving force transmission system which distributes a driving force of a drive source to front and rear wheels of a vehicle.

BACKGROUND ART

Conventionally, there is known a four-wheel drive vehicle in which a driving force of a drive source is transmitted to front wheels at all times while transmitting a required amount of driving force according to the driving conditions of the vehicle to rear wheels via a driving force transmission unit (for example, refer to Patent Document 1).

In a four-wheel drive vehicle described in Patent Document 1, torque transmitted via a propeller shaft is split laterally by a rear gear mechanism to be distributed to rear wheels via a clutch provided at an output side of the gear mechanism. This clutch is pressed in an axial direction by virtue of a thrust produced by a cam mechanism having a first and second cam members which can rotate relatively to thereby transmit the torque to the rear wheels by means of frictional engagement force of a plurality of inner plates and a plurality of outer plates which are disposed coaxially and alternatively. In addition, this cam mechanism is disposed between an outer rotational member which is connected to an output shaft of the gear mechanism and an inner rotational member which is connected to the rear wheels. The first cam member receives torque of the outer rotational member via an electromagnetic clutch of which engagement force can be controlled by a current amount of an electromagnetic coil, and the second cam member is connected to the inner rotational member so as to prohibit relative rotation therebetween. Then, when torque is transmitted to the outer rotational member with the electromagnetic coil energized, part of the torque is transformed into axial thrust by the cam mechanism so as to press the clutch.

RELATED ART DOCUMENTS

Patent Documents

Patent Document 1: JP-A-2009-264518

SUMMARY OF THE INVENTION

Problem to be Solved by the Invention

In the cam mechanism of the four-wheel drive vehicle described in Patent Document 1, since thrust is produced by the relative rotation between the outer rotational member and the inner rotational member, when the rotational speed of the rear wheels is increased or decreased by the turning of the vehicle and the direction of the relative rotation between the outer rotational member and the inner rotational member is reversed, the thrust disappears momentarily. Because of this, the torque that is transmitted to the rear wheels changes abruptly to produce a shock in the driving force transmission system, resulting in a situation in which an occupant of the vehicle feels a sensation of uncomfortableness from noise or vibration produced in association with the shock.

One of objects of the invention is to provide a four-wheel drive vehicle which can reduce a shock produced in a driving force transmission system when the vehicle is turning.

Means for Solving the Problem

In order to solve the above-described problem, the present invention provides a four wheel drive vehicle according to aspects as follows:

(1) A four-wheel drive vehicle including: a drive source which produces torque forming a driving force of the vehicle; a driving force transmission system which transmits the torque of the drive source to a pair of front wheels and a pair of rear wheels via a plurality of gear mechanisms; a clutch provided in the driving force transmission system and capable of controlling an amount of the torque transmitted to the rear wheels; and a pressing mechanism which presses the clutch by transforming a part of the torque transmitted to the rear wheels into axial thrust, wherein in the driving force transmission system, gear ratios of the plurality of gear mechanisms are set such that a direction of a differential rotation between a drive shaft connected to an input side of the clutch and a drive shaft connected to an output side of the clutch is not reversed even when a steered angle of the front wheels changes to a maximum value while the four-wheel drive vehicle is traveling forwards.

(2) The four-wheel drive vehicle according to (1), wherein the driving force transmission system includes: a first differential unit which splits the torque to the pair of front wheels; a second differential unit which splits the torque to the pair rear wheels; a propeller shaft provided between the first and second differential units; a first gear mechanism which connects the first differential unit and the propeller shaft; and a second gear mechanism which connects the second differential unit and the propeller shaft, wherein the clutch is disposed between the second differential unit and one of the pair rear wheels, and wherein gear ratios of the first and second gear mechanisms are set such that a rotation speed of a differential case of the second differential unit relative to a rotation speed of the propeller shaft becomes smaller than a rotation speed of a differential case of the first differential unit relative to the rotation speed of the propeller shaft.

Advantages of the Invention

According to the aspect of the invention, it is possible to reduce a shock produced in a driving force transmission system when the vehicle is turning.

BRIEF DESCRIPTION OF THE DRAWINGS

FIGS. 3(a) to 3(c) are exemplary diagrams showing rotational directions of constituent members of a driving force transmission system when the four-wheel drive vehicle is traveling forwards, in which

FIGS. 4(a) to 4(d) are exemplary diagrams showing exemplarily operations of a cam mechanism and its peripheral portion of the driving force transmission unit, in which

MODE FOR CARRYING OUT THE INVENTION

Embodiment

Figure 1:
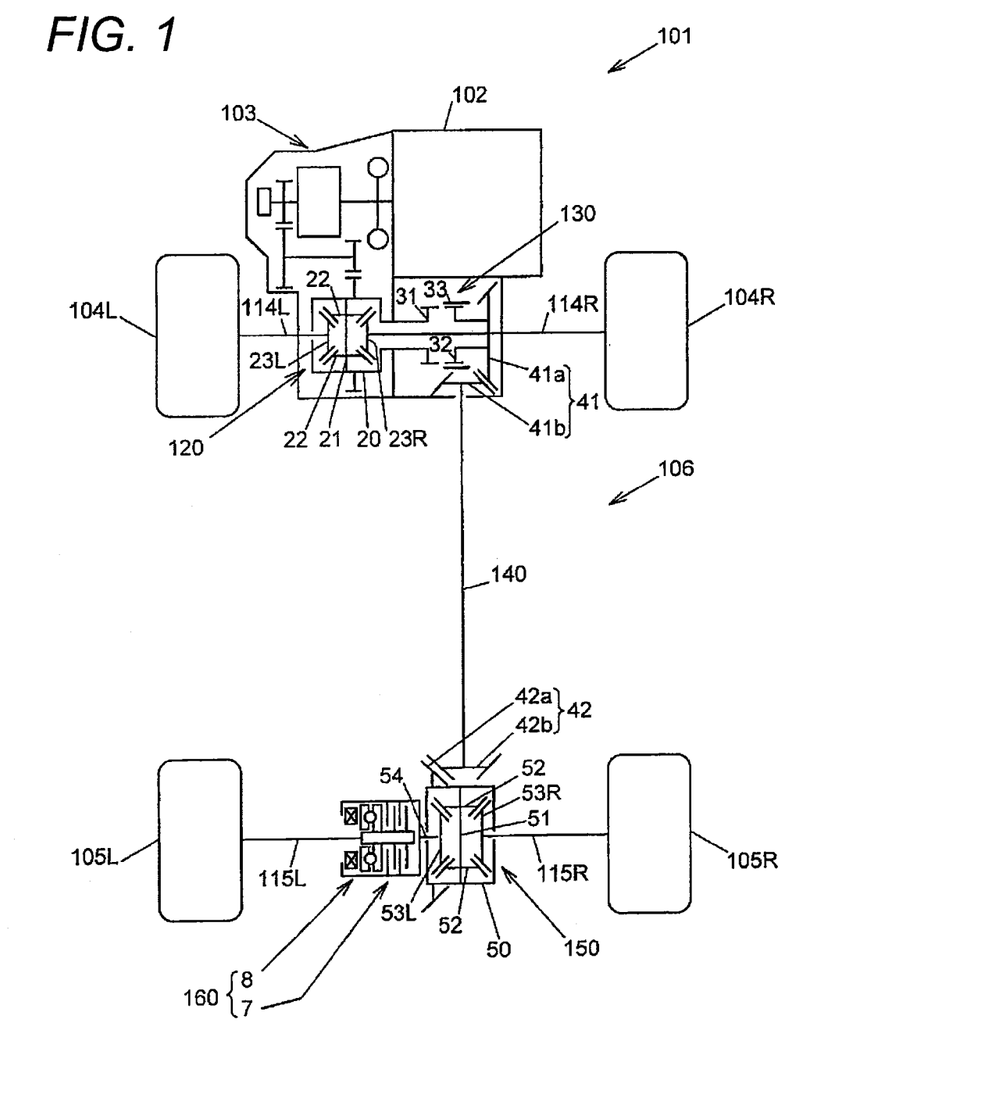
FIG. 1 is a schematic diagram showing a configuration example of a four-wheel drive vehicle according to an embodiment of the invention.

FIG. 1 is a schematic diagram showing a configuration example of a four-wheel drive vehicle. As shown in FIG. 1, a four-wheel drive vehicle 101 has an engine 102 which is a drive source for generating torque which constitutes the driving force of the four-wheel drive vehicle 101, a transmission 103 which changes the speed of output power of the engine 102, a pair of front wheels 104L, 104R which are main drive wheels, a pair of rear wheels 105L, 105R which are auxiliary drive wheels and a driving force transmission system 106 which transmits the torque of the engine 102 to the front wheels 104L, 104R and the rear wheels 105L, 105R.

The front wheels 104L, 104R are steered wheels of which a turning direction is inclined relative to a vehicle body within a predetermined angle range according to a steering operation performed by the driver. In addition, in this embodiment, it should be understood that wheel diameters of the front wheels 104L, 104R and the rear wheels 105L, 105R are all identical.

The driving force transmission system 106 has a front differential 120, a dog clutch 130, a propeller shaft 140, and a rear differential 150. In this driving force transmission system 106, output torque from the front differential 120 is transmitted to the front wheels 104L, 104R by way of left and right drive shafts 114L, 114R, respectively, and output torque from the rear differential 150 is transmitted to the rear wheels 105L, 105R by way of left and right drive shafts 115L, 115R, respectively. Additionally, in the driving force transmission system 106, a driving force transmission unit 160 is provided between the rear differential 150 and the left drive shaft 115L.

The front differential 120 has a differential case 20 which is rotated by torque outputted from the transmission 103, a pinion shaft 21 which is held on the differential case 20, a pair pinion gears 22, 22 which are rotatably supported on the pinion shaft 21, and a pair of side gears 23L, 23R which mesh with the pinion gears 22, 22 in such a state that their gear shafts intersect each other at right angles. The left side gear 23L is connected to the left drive shaft 114L and rotates at a speed equal to a speed at which the left drive shaft 114L and the left front wheels 104L rotate. Additionally, the right side gear 23R is connected to the right drive shaft 114R and rotates at a speed equal to a speed at which the right drive shaft 114R and the right front wheel 104R rotate. In this configuration, the front differential 120 splits the torque inputted into the differential case 20 to the front wheels 104L, 104R while allowing the left and right front wheels to rotate at different speeds.

The dog clutch 130 has a first tooth portion 31 which is fixed to an outer circumferential portion of the differential case 20 of the front differential 120 so as not to rotate relative to the differential case 20, a second tooth portion 32 which is fixed so as not to rotate relative to a ring gear 41a, which will be described later, and a cylindrical sleeve 33 which can move back and forth along the direction of a rotational shaft of the differential case 20. Axially extending spline grooves are formed on outer circumferential surfaces of the first tooth portion 31 and the second tooth portion 32, while spline teeth, which are adapted to mesh with the spline grooves, are formed on an inner circumferential surface of the sleeve 33. When the sleeve 33 meshes with both the first tooth portion 31 and the second tooth portion 32, the dog clutch 130 connects the differential case 20 and the ring gear 41a together so as to allow for torque transmission therebetween, while when the sleeve 33 meshes with only either of the first tooth portion 31 and the second tooth portion 32, the dog clutch 130 cuts off the torque transmission between the differential case 20 and the ring gear 41a.

A first gear mechanism 41 is provided at a front wheel end of the propeller shaft 140, and a second gear mechanism 42 is provided at a rear wheel end of the propeller shaft 140. The propeller shaft 140 is connected to the second tooth portion 32, which constitutes an output side of the dog clutch 130, at one end thereof by the first gear mechanism 41 and is connected to a differential case 50, which will be described later, of the rear differential 150 at the other end thereof by the second gear mechanism 42.

The first gear mechanism 41 includes the ring gear 41a having a bevel gear which rotates together with the second tooth portion 32 of the dog clutch 130 and a pinion gear 41b that meshes with the ring gear 41a and which has a bevel gear which is fixed to the one end of the propeller shaft 140.

The second gear mechanism 42 includes a ring gear 42a having a bevel gear which is fixed to the differential case 50 of the rear differential 150 and a pinion gear 42b that meshes with the ring gear 42a and which has a bevel gear which is fixed to the other end of the propeller shaft 140.

The rear differential 150 has the differential case 50 which is rotated by the torque transmitted via the propeller shaft 140, a pinion shaft 51 which is held on the differential case 50, a pair of pinion gears 52, 52 which are supported rotatably on the pinion shaft 51, and a pair of side gears 53L, 53R which mesh with the pinion gears 52, 52 in such a state that their gear shafts intersect each other at right angles. The left side gear 53L is connected to an intermediate shaft 54 which is disposed between the driving force transmission unit 160 and the left side gear 53L so as not to rotate relative to the intermediate shaft 54. Additionally, the right side gear 53R is connected to the right drive shaft 115R so as not to rotate relative to the right drive shaft 115R and rotates at a speed equal to a speed at which the right drive shaft 115R and the right rear wheel 105R rotate.

The driving force transmission unit 160 has a multi-plate clutch 7 and a pressing mechanism 8 which presses this multi-plate clutch 7 in an axial direction and transmits torque which corresponds to a pressing force of the multi-plate clutch 7 from the intermediate shaft 54 to the left drive shaft 115L. The intermediate shaft 54 and the left drive shaft 115L are examples of drive shafts which are connected to an input side and an output side of the multi-plate clutch 7, respectively. The configuration of the driving force transmission unit 160 will be described later.

Being configured in the way described above, the driving force transmission system 106 transmits the torque from the side gears 23L, 23R of the front differential 120 to the front wheels 104L, 104R by way of the left and right drive shafts 114L, 114R. In addition, the driving force transmission system 106 transmits the torque from the differential case 20 of the front differential 120 through the dog clutch 130, the first gear mechanism 41, the propeller shaft 140, the second gear mechanism 42 and the rear differential 150 to the left rear wheel 105L via the left drive shaft 115L with the driving force transmission unit 160 interposed therebetween and to the right rear wheel 105R via the right drive shaft 115R.

Figure 2:
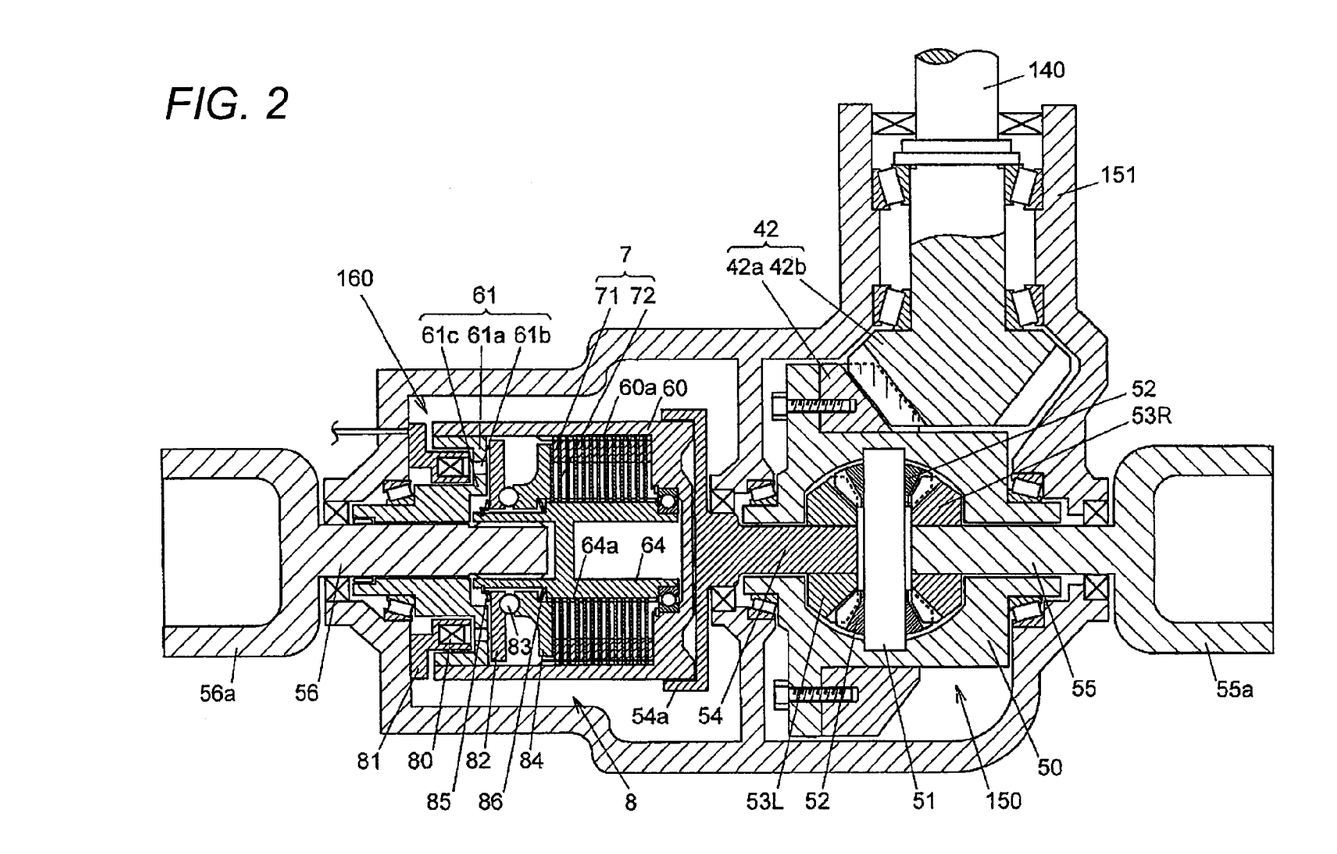
FIG. 2 is a sectional view showing a configuration example of a driving force transmission unit and its peripheral portion according to the embodiment of the invention.

FIG. 2 is a sectional view showing a configuration example of the driving force transmission unit 160 and its peripheral portion. The driving force transmission unit 160 is accommodated together with the rear differential 150 in a rear differential carrier 151 and has a cylindrical bottomed outer housing 60 which is connected to the intermediate shaft 54 so as not to rotate relative to the intermediate shaft 54, including the multi-plate clutch 7 and the pressing mechanism 8 in an interior of the outer housing 60.

The outer housing 60 is connected to a flange 54a of the intermediate shaft 54 at an outer circumferential surface of a bottom portion thereof so as to rotate together with the intermediate shaft 54. In addition, a spline portion 60a having a plurality of spline teeth which extend in an axial direction is formed on an inner circumferential surface of a cylindrical portion of the outer housing 60, and an open end portion of the outer housing 60 is closed by an annular rear housing 61.

The rear housing 61 has a first element 61a which is made of a magnetic material which is fixed to the opening portion of the outer housing 60 so as not to rotate relative to the outer housing 60 through screwing or welding, a second element 61b having a ring shape which is made of a non-magnetic material which is fixed to an inner side of the first element 61a, and a third element 61c which is made of a magnetic material which is fixed to an inner side of the second element 61b.

A cylindrical inner shaft 64 is disposed in an inner circumferential portion of the outer housing 60 and is supported concentrically with the outer housing 60 and so as not to rotate relative to the outer housing 60. A spline portion 64a having a plurality of spline teeth which extends in the axial direction is formed on an area of an outer circumferential surface of the inner shaft 64 which oppositely faces the spline portion 60a of the outer housing 60. A shaft-like member 56, which has an outer ring 56a of a constant velocity joint to which one end of the left drive shaft 115L (shown in FIG. 1) is connected so as to swing, is spline fitted in an inner circumferential surface of the inner shaft 64.

In the multi-plate clutch 7, a plurality of annular outer clutch plates 71 and a plurality of similarly annular inner clutch plates 72 are disposed alternately in the axial direction. A plurality of projections are formed on outer circumferential edges of the outer clutch plates 71 so as to be brought into engagement with the spline portion 60a of the outer housing 60. Additionally, a plurality of projections are formed on inner circumferential edges of the inner clutch plates 72 so as to be brought into engagement with the spline portion 64a of the inner shaft 64. By adopting this configuration, the outer clutch plates 71 and the inner clutch plates 72 are restricted from rotating relative to the outer housing 60 and the inner shaft 64, relatively but are allowed to move in the axial direction.

The pressing mechanism 8 is disposed parallel to the multi-plate clutch 7 and has an electromagnetic coil 80, a yoke 81 made of a magnetic material which supports the electromagnetic coil 80, a first cam member 82 having an annular shape, a second cam member 84 having an annular shape which is disposed so as to oppositely face the first cam member 82 and spherical cam followers 83 which are interposed between the first cam member 82 and the second cam member 84.

The electromagnetic coil 80 is disposed so as to hold the rear housing 61 between the first cam member 82 and itself and attracts the first cam member 82 towards the rear housing 61 by means of a magnetic force generated therein by being energized.

The second cam member 84 is disposed so that one axial side surface thereof oppositely faces the inner clutch plate 72 of the plurality of inner clutch plates 72 of the multi-plate clutch 7 which is disposed as close to the pressing mechanism 8 as possible and has a plurality of projections adapted to brought into engagement with the spline portion 64a of the inner shaft 64 on part of an inner circumferential surface thereof. Consequently, the second cam member 84 is restricted from rotating relative to the inner shaft 64 but is allowed to move in the axial direction.

Circumferentially inclined cam surfaces are formed on oppositely facing surfaces of the first cam member 82 and the second cam member 84, and the cam followers 83 are disposed so as to roll along both the cam surfaces. In addition, the first cam member 82 and the second cam member 84 are biased so as to move towards each other by a coned disc spring 85 and a coned disc spring 86, respectively.

In the configuration described above, when the first cam member 82 frictionally slides against the rear housing 61 by means of a magnetic force of the electromagnetic coil 80, part of torque that is transmitted from the intermediate shaft 54 towards the left rear wheel 105L is transmitted to the first cam member 82 as a rotational force, and the first cam member 82 and the second cam member 84 rotate relative to each other by means of the rotational force so transmitted. Then, the cam followers 83 roll on the cam surfaces of the first cam member 82 and the second cam member 84 by the relative rotation to thereby produce axial thrust, whereby the multi-plate clutch 7 is pressed by the second cam member 84 which receives the thrust. Namely, the pressing mechanism 8 transforms part of the torque that is transmitted to the left rear wheel 105L into the axial thrust to thereby press the multi-plate clutch 7. The rotational force that the first cam member 82 receives from the rear housing 61 changes according to the strength of the magnetic force of the electromagnetic coil 80, and therefore, the pressing force applied to the multi-plate clutch 7 can be controlled by controlling a current supplied to the electromagnetic coil 80.

In addition, when the energization of the electromagnetic coil 80 is interrupted, the first cam member 82 is caused to move away from the rear housing 61 by means of a spring force of the coned disc spring 85, and the first cam member 82 no more receives the rotational force that is produced by the relative rotation between the first cam member 82 and the second cam member 84. Therefore, the axial thrust disappears, and the second cam member 84 is caused to move in a direction in which the second cam member 84 moves away from the multi-plate clutch 7 by means of a spring force of the coned disc spring 86.

In this configuration, the torque that is transmitted to the side gear 53L of the rear differential 150 is transmitted to the left rear wheel 105L by way of the shaft-like member 56 and the left drive shaft 115L in such a manner as to be interrupted by the driving force transmission unit 160. Additionally, the torque that is transmitted to the side gear 53R of the rear differential 150 is transmitted to the right rear wheel 105R by way of a shaft-like member 55 which is connected to the side gear 53R so as not to rotate relative to the side gear 53R and the right drive shaft 115R which is connected to an outer ring 55a of a constant velocity joint which is provided at one end of the shaft-like member 55 so as to swing.

In addition, when the four-wheel drive vehicle 101 is driven in a four-wheel drive mode, the electromagnetic coil 80 is energized to execute the torque transmission by the driving force transmission unit 160, and the sleeve 33 of the dog clutch 130 is caused to mesh with both the first tooth portion 31 and the second tooth portion 32 so that the differential case 20 of the front differential 120 and the propeller shaft 140 are connected together. By doing so, the torque of the engine 102 is transmitted to the pair of front wheels 104L, 104R and the pair of rear wheels 105L, 105R.

On the other hand, when the four-wheel drive vehicle 101 is driven in a two-wheel drive mode, the energization of the electromagnetic coil 80 is stopped so as to cut off the torque transmission by the driving force transmission unit 160, and the connection of the differential case 20 and the propeller shaft 140 by the dog clutch 130 is released. In this way, when the four-wheel drive vehicle 101 is driven in the two-wheel drive mode, the torque transmission by the driving force transmission system 106 is cut off at an upstream end (an end facing the engine 102) and a downstream end (an end facing the rear wheels 105L, 105R) of the propeller shaft 140. Therefore, the rotation of the propeller shaft 140 and the differential case 50 of the rear differential 150 which is connected to the propeller shaft 140 relative to the vehicle body is stopped. By doing so, the running resistance of the vehicle is reduced which results from the rotational resistance of the propeller shaft 140 and the stirring resistance of lubrication oil by the ring gears 41a, 42a.

In addition, when the four-wheel drive vehicle 101 is shifted from the two-wheel drive mode to the four-wheel drive mode, first of all, the amount of current supplied to the electromagnetic coil 80 is increased gradually, so that torque of the rear wheel 105L, 105R is transmitted to the propeller shaft 140 by the driving force transmission unit 160 to thereby rotate the propeller shaft 140, whereafter the dog clutch 130 is engaged after the first tooth portion 31 and the second tooth portion 32 of the dog clutch 130 are synchronized with each other. On the contrary to this, when the four-wheel drive vehicle 101 is shifted from the four-wheel drive mode to the two-wheel drive mode, the amount of current supplied to the electromagnetic coil 80 is decreased gradually, so that the twisting of the propeller shaft 140 by the torque transmitted to the rear wheels is eliminated, whereafter the meshing engagement by the dog clutch 130 is released. By switching the drive modes between the two-wheel drive mode and the four-wheel drive mode in this way, the shock is suppressed which would be otherwise produced when the drive modes are switched over.

Figure 3A:
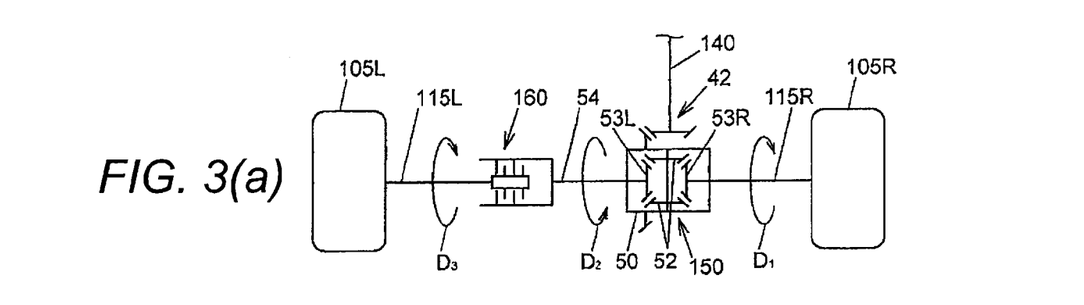
FIG. 3(a) shows a state in which the four-wheel drive vehicle is traveling forwards in a two-wheel drive mode.
Figure 3B:
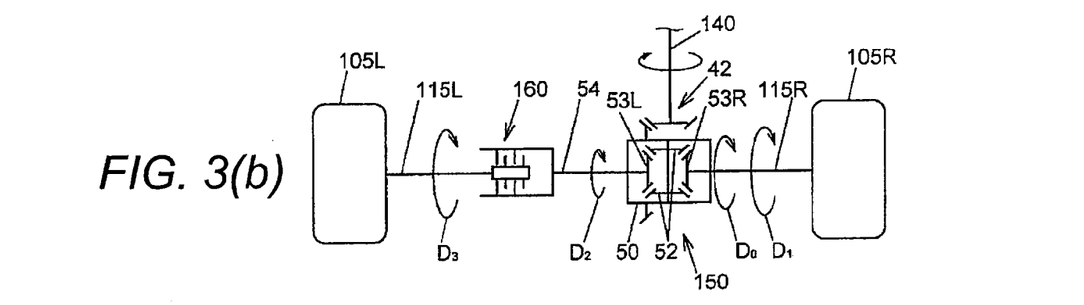
FIG. 3(b) shows a state in which the four-wheel drive vehicle is traveling forwards in a four-wheel drive mode.
Figure 3C:
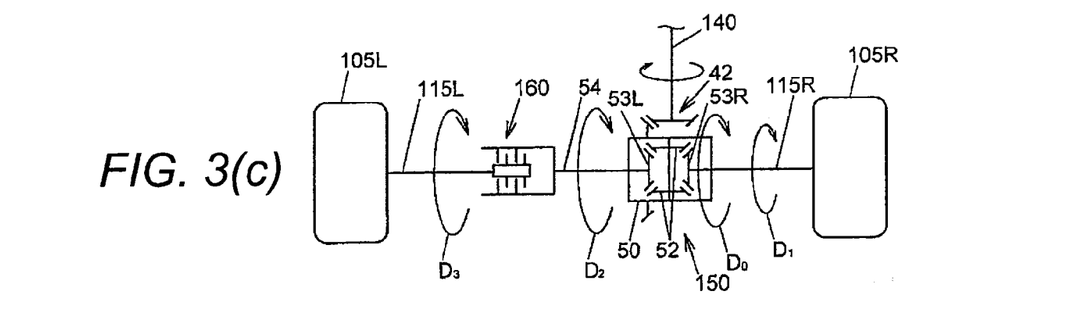
FIG. 3(c) shows a state in which the four-wheel drive vehicle is turning to right at a maximum steered angle in the four-wheel drive mode.

FIGS. 3(a) to 3(c) are exemplary diagrams showing the rotational directions of the differential case 50 of the rear differential 150, the drive shafts 115R, 115L and the intermediate shaft 54 when the four-wheel drive vehicle 101 is traveling forwards. FIG. 3(a) shows a state in which the four-wheel drive vehicle 101 is traveling forwards in the two-wheel drive mode, FIG. 3(b) shows a state in which the four-wheel drive vehicle 101 is traveling forwards in the four-wheel drive mode, and FIG. 3(c) shows a state in which the four-wheel drive vehicle is turning to the right at a maximum steered angle in the four-wheel drive mode. Additionally, in FIGS. 3(a) to 3(c), the rotational directions of the differential case 50, the right drive shaft 115R, the intermediate shaft 54 and the left drive shaft 115L are denoted by an arrow 00, an arrow 01, an arrow 02, and an arrow 03, respectively, and respective rotational speeds of these constituent members are represented by respective sizes of the arrows. However, the vehicle speed remains the same in any of the states.

As shown in FIG. 3(a), when the four-wheel drive vehicle 101 is traveling in the two-wheel drive mode, as previously described, although the propeller shaft 140 and the differential case 50 do not rotate, the rear wheels 105L, 105R rotate by means of a frictional force with a road surface which is produced in association with the traveling of the four-wheel drive vehicle 101. Therefore, the left and right drive shafts 115R, 115L rotated in the direction indicated by the arrows D1 and D3 (hereinafter, this direction being referred to as a "forward direction").

Additionally, the right side gear 53R rotates together with the right drive shaft 115R in such a state that the differential case 50 does not rotate, and therefore, the pair of pinion gears 52, 52 which mesh with the right side gear 53R rotate, and the left side gear 53L rotates in an opposite direction to the direction in which the right side gear 53R rotates. This causes the intermediate shaft 54 to rotate in the direction indicated by the arrow D2 (hereinafter, this direction being referred to as an "opposite direction").

In this way, the intermediate shaft 54 which is connected to the input side of the driving force transmission unit 160 and the left drive shaft 115L which is connected to the output side of the same unit 160 rotated in the opposite directions to each other, and therefore, a large differential rotation is produced between the outer housing 60 and the inner shaft 64 of the driving force transmission unit 160.

Additionally, as shown in FIG. 3(b), when the four-wheel drive vehicle 101 is traveling forwards in the four-wheel drive mode, the torque is transmitted to the rear differential 150 via the propeller shaft 140, and the differential case 50, the left and right drive shafts 115R, 115L and the intermediate shaft 54 all rotate in the forward direction. Additionally, the rotational speeds of the left and right drive shafts 115R, 115L are the same.

Here, in this embodiment, the driving force transmission system 106 is configured so that the intermediate shaft 54 rotates more slowly than the left drive shaft 115L by so setting gear ratios of the first gear mechanism 41 and the second gear mechanism 42. Namely, the gear ratios of the first gear mechanism 41 and the second gear mechanism 42 are set so that the rotational speed of the differential case 50 of the rear differential 150 relative to the rotational speed of the propeller shaft 140 becomes smaller than the rotational speed of the differential case 20 of the front differential 120 relative to the propeller shaft 140. In other words, the driving force transmission system 106 is configured so that the differential case 50 is decelerated more than the differential case 20 in the process of transmitting torque from the differential case 20 of the front differential 120 to the differential case 50 of the rear differential 150. By adopting this configuration, a differential rotation which is smaller than that produced in the two-wheel drive mode is produced between the outer housing 60 and the inner shaft 64 of the driving force transmission unit 160. Additionally, the differential case 50 rotates at a speed which is situated somewhere between the rotational speed of the intermediate shaft 54 and the rotational speed of the right drive shaft 115R.

In addition, as shown in FIG. 3(c), when the four-wheel drive vehicle 101 is turning to the right (in a direction opposite to a side of the rear differential 150 where the driving force transmission unit 160 is provided) in the four-wheel drive mode, compared to the state shown in FIG. 3(b) in which the four-wheel drive vehicle 101 is traveling forwards in the four-wheel drive mode, the left drive shaft 115L rotates in the forward direction at a faster speeds, and the right drive shaft 115R rotates in the forward direction at a speed which is slower than that at which the four-wheel vehicle 101 is traveling forwards.

Due to the rotational speed of the left drive shaft 115L becoming faster than that when the four-wheel drive vehicle 101 is traveling forwards, the differential rotation between the left drive shaft 115L and the intermediate shaft 54 (the differential rotation between the outer housing 60 and the inner shaft 64) becomes small. However, in this case, too, the gear ratios of the first gear mechanism 41 and the second gear mechanism 42 are set so that the intermediate shaft 54 rotates more slowly than the left drive shaft 115L. Namely, the gear ratios of the first gear mechanism 41 and the second gear mechanism 42 are set so that even when the steered angle of the front wheels 104L, 104R changes to a maximum value, the direction of the differential rotation between the intermediate shaft 54 which is connected to the input side of the multi-plate clutch 7 and the left drive shaft 115L which is connected to the output side thereof is not reversed.

In this embodiment, the gear ratio r1 of the first gear mechanism 41 (the number of teeth of the ring gear 41a/the number of teeth of the pinion gear 41b) is set to 3, and the gear ratio r2 of the second gear mechanism 42 (the number of teeth of the ring gear 42a/the number of teeth of the pinion gear 42b) is set to 3.7 (the gear ratio r1<the gear ratio r2).

Working Effects of the Embodiment

Figure 4A:
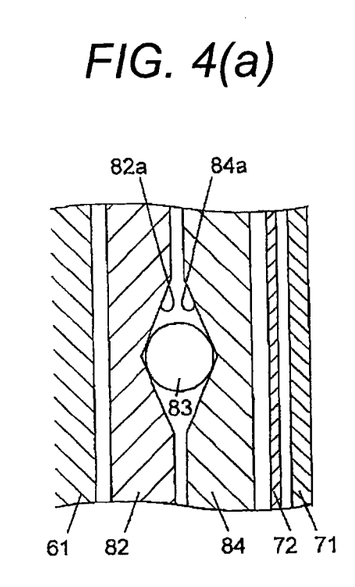
FIG. 4(a) shows an operation state when the four-wheel drive vehicle is traveling in the two-wheel drive mode.
Figure 4B:
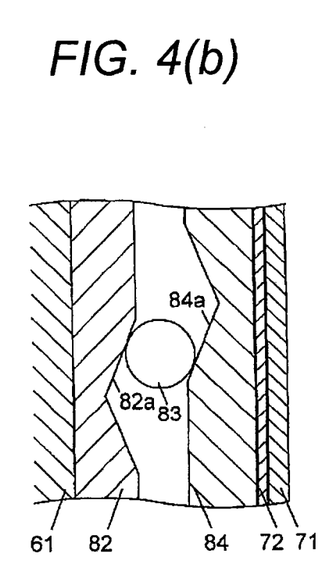
FIG. 4(b) shows an operation state in which the four-wheel drive vehicle is traveling in the four-wheel drive mode.
Figure 4C:
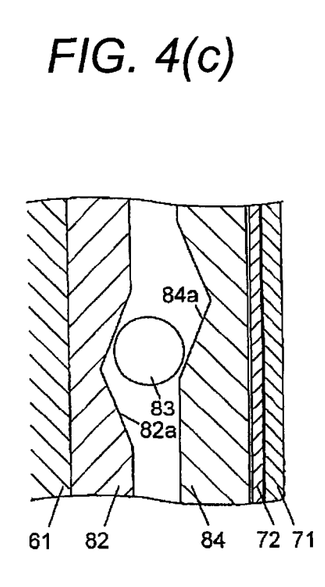
FIG. 4(c) shows a state in which a reverse of a differential rotation initiates.
Figure 4D:
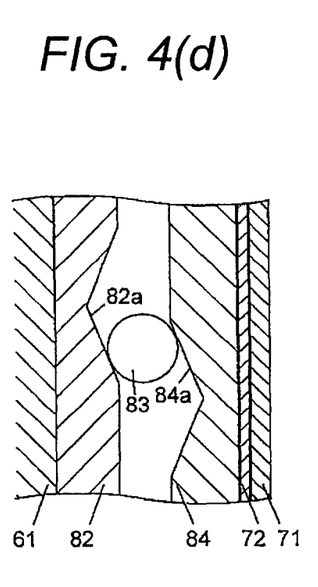
FIG. 4(d) shows a state in which the reverse of the differential rotation is completed.

FIGS. 4(a) to 4(d) are explanatory diagram showing exemplarily operations of a cam mechanism and its peripheral portion of the driving force transmission unit 160. FIG. 4(a) shows an operation state when the four-wheel drive vehicle 101 is traveling in the two-wheel drive mode, FIG. 4(b) shows an operation state in which the four-wheel drive vehicle 101 is traveling in the four-wheel drive mode, FIG. 4(c) shows a state in which a reverse of a differential rotation initiates, and FIG. 4(d) shows a state in which the reverse of the differential rotation is completed.

As shown in FIG. 4(a), in the two-wheel drive state, since no magnetic force is applied to the first cam member 82, the first cam member 82 is caused to move away from the rear housing 61 by means of the spring force of the coned disc spring 85. Because of this, the rotational force is not transmitted to the first cam member 82 which would produce a relative rotation between the first cam member 82 and the second cam member 84, and hence, a cam force is not generated which would be thrust by which the second cam member 84 presses the multi-plate clutch 7. Consequently, the torque transmission by the multi-plate clutch 7 is not executed. In this state, the cam follower 83 is situated in deepest positions (neutral positions) of a cam groove 82a of the first cam member 82 and a cam groove 84a of the second cam member 84.

When the electromagnetic coil 80 is energized while the four-wheel drive vehicle 101 is traveling forwards, as shown in FIG. 4(b), the first cam member 82 is brought into friction contact with the rear housing 61, whereby the first cam member 82 and the second cam member 84 rotate relative to each other by means of a rotational force which the first cam member 82 receives from the rear housing 61. Because of this, the cam follower 83 rolls in the cam groove 82a of the first cam member 82 and the cam groove 84a of the second cam member 84 to thereby forcibly open a space between the first cam member 82 and the second cam member 84. By dosing so, an axial cam force acts on the second cam member 84, and the second cam member 84 presses the multi-plate clutch 7 so that the outer clutch plates 71 and the inner clutch plates 72 are pressed to come into frictional contact with each other. By doing so, a torque transmission is executed between the outer housing 60 and the inner shaft 64, that is, between the intermediate shaft 54 and the left drive shaft 115L.

In case the rotation speed of the left drive shaft 115L becomes slower than that of the intermediate shaft 54, the differential rotation being thereby reversed, as shown in FIG. 4(c), the relative rotation angle between the first cam member 82 and the second cam member 84 becomes small, whereby the cam follower 83 is displaced so as to return to the neutral position. Because of this, the cam force is decreased, and the pressing force by which the multi-plate clutch 7 is pressed is decreased.

When the reverse of the differential rotation continues further, as shown in FIG. 4(d), the cam follower 83 moves to respective inclined surfaces of the cam grooves which lie opposite to the cam groove 82a of the first cam member 82 and the cam groove 84a of the second cam member 84, whereby an axial cam force acts again on the second cam member 84, and the second cam member 84 presses the multi-plate clutch 7.

Since the torque transmitted via the multi-plate clutch 7 changes abruptly in this process, a shock is produced, causing an occupant of the vehicle to feel a sensation of uncomfortableness. According to this embodiment, however, when the four-wheel drive vehicle 101 is traveling forwards in the four-wheel drive mode, even in the event that the rotation speed of the left rear wheel 105L relative to the differential case 50 is increased or decreased due to the turning of the four-wheel drive vehicle 101, the gear rations of the first gear mechanism 41 and the second gear mechanism 42 are set so that the reverse of the differential rotation described above is not produced, and therefore, no such problem is caused.

Figure 5:
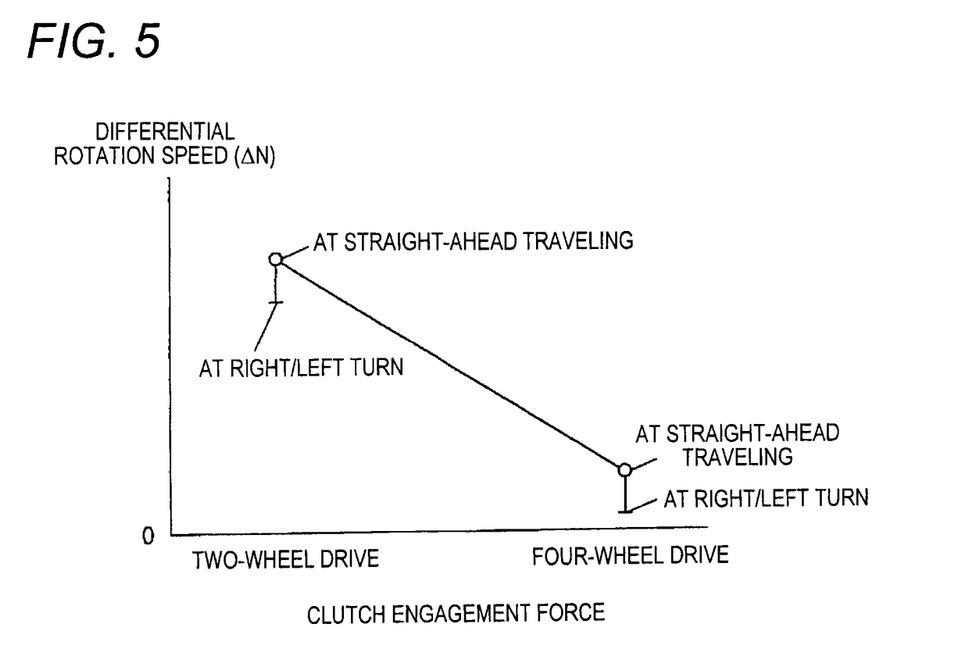
FIG. 5 is a graph showing a differential rotating state of the driving force transmission unit when the four-wheel drive vehicle according to the embodiment is traveling forwards and turning to left and right in the two-wheel drive mode and the four-wheel drive mode.

FIG. 5 is a graph showing a differential rotating speed ΔN of between the intermediate shaft 54 and the left drive shaft 115L (=the rotation speed of the left drive shaft 115L when it rotates in the forward direction−the rotation speed of the intermediate shaft 54 when it rotates in the forward direction) when the four-wheel drive vehicle 101 according to the embodiment is traveling forwards and turning to left and right in the two-wheel drive mode and the four-wheel drive mode.

As previously described, when the four-wheel drive vehicle 101 is traveling in the two-wheel drive mode, the intermediate shaft rotates in a reverse direction while the left drive shaft 115L rotates in the forward direction, and therefore, ΔN takes a positive value. Additionally, an absolute value of the positive value is large. For example, when the rear wheels 105L, 105R have a wheel diameter of 60 cm and the four-wheel drive vehicle 101 travels straight ahead at a speed of 40 km/h, the value of ΔN becomes approximately 700 rpm. In addition, the magnitude of ΔN also changes by the turning of the four-wheel drive vehicle 101. ΔN (the absolute value) resulting when the four-wheel drive vehicle 101 is turning to the right becomes smaller than ΔN (the absolute value) resulting when the four-wheel drive vehicle 101 travels straight ahead.

On the other hand, when the four-wheel drive vehicle 101 is traveling in the four-wheel drive mode, since both the intermediate shaft 54 and the left drive shaft 115L rotate in the forward direction, the magnitude of ΔN then becomes smaller than ΔN resulting when the four-wheel drive vehicle 101 travels in the two-wheel drive. Additionally, since the intermediate shaft 54 rotates more slowly than the left drive shaft 115L, ΔN takes a positive value. The magnitude of ΔN changes when the four-wheel drive vehicle 101 turns to the right, and ΔN becomes smaller when the four-wheel drive vehicle 101 turns than when the same vehicle travels straight ahead. Additionally, ΔN also becomes smaller when the four-wheel drive vehicle 101 turns to the left than when the same vehicle travels straight ahead.

In this embodiment, ΔN is prevented from taking a negative value even when the four-wheel drive vehicle 101 turns to the right at a maximum steered angle by the setting of the gear ratios of the first gear mechanism 41 and the second gear mechanism 42. By adopting this configuration, vibration and noise can be reduced which would otherwise be produced by the abrupt change in torque that is transmitted to the rear wheels when the four-wheel drive vehicle 101 turns in the four-wheel drive mode. Additionally, the magnitude of ΔN resulting when the four-wheel drive vehicle 101 turns to the right at the maximum steered angle should be 2 rpm or more in the aforesaid driving conditions, that is, 0.3% or more of the magnitude of ΔN resulting when the four-wheel drive vehicle 101 travels in the two-wheel drive mode.

In addition, as to ΔN resulting when the four-wheel drive vehicle 101 turns to the right at the maximum steered angle, in consideration of a maximum slip ratio of tires that can be produced by acceleration, the gear ratios of the first gear mechanism 41 and the second gear mechanism 42 should be set so that ΔN does not take a negative value even when the four-wheel drive vehicle 101 is accelerated while it is turning to the right.

Other Embodiments

Thus, while the four-wheel drive vehicle according to the embodiment of the invention has been described heretofore, the invention is not limited to the embodiment and hence can be carried out in various forms without departing from the spirit and scope thereof. For example, the following modifications can be made thereto.

(1) In the embodiment, while the driving force transmission unit 160 is provided on the left-hand side of the rear differential 150 when seen in the traveling direction of the vehicle, the invention is not limited thereto. Thus, the driving force transmission unit 160 may be provided on a right-hand side of the rear differential 150 when seen in the traveling direction of the vehicle.

(2) In addition, in the embodiment, while the single driving force transmission unit 160 is provided for the left rear wheel 105L, two driving force transmission units 160 may be provided so as to correspond individually to the left rear wheel 105L and the right rear wheel 105R. In this case, in place of the rear differential 150, a bevel gear type gear mechanism having no differential function can be used which transmits torque transmitted by way of the propeller shaft 140 individually to the driving force transmission units 160.

(3) Additionally, in the embodiment, while the driving force transmission system 106 is configured so that the differential case 50 of the rear differential 150 rotates more slowly than the differential case 20 of the front differential 120 by setting the rear ratio r1 of the first gear mechanism 41 to be smaller than the gear ratio r2 of the second gear mechanism 42, the invention is not limited thereto. The driving force transmission system 106 may be configured so that the differential case 50 of the rear differential 150 rotates more slowly than the differential case 20 of the front differential 120 by setting the wheel diameter of the front wheels 104L, 104R to be smaller than the wheel diameter of the rear wheels 105L, 105R.

(4) In addition, in the embodiment, while the dog clutch 130 is adopted as an engaging/disengaging mechanism which cuts off the transmission of torque at the upstream end of torque transmission by the propeller shaft 140, the engaging/disengaging mechanism is not limited to the dog clutch, and hence, a multi-plate clutch may be adopted. Additionally, the engaging/disengaging mechanism does not have to be provided which cuts off the transmission of torque at the upstream end of torque transmission by the propeller shaft 140.

DESCRIPTION OF REFERENCE SIGNS 7 multi-plate clutch; 8 pressing mechanism; 20 differential case; 21, 51 pinion shaft; 22, 52 pinion gear; 23L, 23R, 53L, 53R side gear; 31 first tooth portion; 32 second tooth portion; 33 sleeve; 41 first gear mechanism; 42 second gear mechanism; 41a, 42a ring gear; 41b, 42b pinion gear; 50 differential case; 54 intermediate shaft; 54a flange; 55, 56 shaft-like member; 55a, 56a outer ring; 60 outer housing; 60a spline portion; 61 rear housing; 61a first element; 61b second element; 61c third element; 64 inner shaft; 64a spline portion; 71 outer clutch plate; 72 inner clutch plate; 80 electromagnetic coil; 81 yoke; 82 first cam member; 82a, 84a cam groove; 83 cam follower; 84 second cam member; 101 four-wheel drive vehicle; 102 engine; 103 transmission; 140 propeller shaft; 104L left front wheel; 104R right front wheel; 105L left rear wheel; 105R right rear wheel; 106 driving force transmission system; 114L, 114R, 115L, 115R drive shaft; 120 front differential; 130 dog clutch; 140 propeller shaft; 150 rear differential; 151 differential carrier; 160 driving force transmission unit.

The invention claimed is:

1. A four-wheel drive vehicle comprising:
a drive source which produces torque forming a driving force of the vehicle;
a driving force transmission system which transmits the torque of the drive source to a pair of front wheels and a pair of rear wheels via a plurality of gear mechanisms;
a clutch provided in the driving force transmission system and controlling an amount of the torque transmitted to the rear wheels; and
a pressing mechanism which presses the clutch by transforming a part of the torque transmitted to the rear wheels into axial thrust against the clutch,
wherein in the driving force transmission system, a first drive shaft is connected between an input side of the clutch and a first differential unit which splits the torque to the pair rear wheels, a second drive shaft is connected between an output side of the clutch and one of the rear wheels, and gear ratios of the plurality of gear mechanisms are set to prevent reversal of a direction of a differential rotation between the first drive shaft connected to the input side of the clutch and the second drive shaft connected to the output side of the clutch even when a steered angle of the front wheels changes to a maximum value while the four-wheel drive vehicle is traveling forwards.

2. The four-wheel drive vehicle according to claim 1, wherein the driving force transmission system comprises:
the first differential unit which includes a first differential case;
a second differential unit which splits the torque to the pair front wheels, and which includes a second differential case;
a propeller shaft provided between the first and second differential units;
a first gear mechanism which connects the first differential unit and the propeller shaft; and
a second gear mechanism which connects the second differential unit and the propeller shaft,
wherein the clutch is disposed between the first differential unit and one of the rear wheels, and wherein gear ratios of the first and second gear mechanisms are set such that a rotation speed of the first differential case of the first differential unit relative to a rotation speed of the propeller shaft becomes smaller than a rotation speed of the second differential case of the second differential unit relative to the rotation speed of the propeller shaft.

3. The four-wheel drive vehicle according to claim 1, wherein the pressing mechanism includes an electromagnetic coil.

4. The four-wheel drive vehicle according to claim 1, wherein the pressing mechanism includes a first cam, a second cam, and spherical cam followers interposed between the first cam and the second cam, and
the first cam and the second cam rotate relative to each other, and the cam followers roll on cam surfaces of the first cam and the second cam by the relative rotation, whereby the axial thrust is produced.

5. The four-wheel drive vehicle according to claim 1, wherein a gear ratio of a first gear mechanism which connects the first differential unit and a first end of a propeller shaft is greater than a gear ratio of a second gear mechanism connected to a second end of the propeller shaft.

6. A four-wheel drive vehicle comprising:
a drive source which produces torque forming a driving force of the vehicle;
a driving force transmission system which transmits the torque of the drive source to a pair of front wheels and a pair of rear wheels via a plurality of gear mechanisms;
a clutch provided in the driving force transmission system and controlling an amount of the torque transmitted to the rear wheels; and
a pressing mechanism which presses the clutch by transforming a part of the torque transmitted to the rear wheels into axial thrust against the clutch, wherein the pressing mechanism includes an electromagnetic coil, and
wherein in the driving force transmission system, gear ratios of the plurality of gear mechanisms are set to prevent reversal of a direction of a differential rotation between a first drive shaft connected to an input side of the clutch and a second drive shaft connected to an output side of the clutch even when a steered angle of the front wheels changes to a maximum value while the four-wheel drive vehicle is traveling forwards.

7. A four-wheel drive vehicle comprising:
a drive source which produces torque forming a driving force of the vehicle;
a driving force transmission system which transmits the torque of the drive source to a pair of front wheels and a pair of rear wheels via a plurality of gear mechanisms;
a clutch provided in the driving force transmission system and controlling an amount of the torque transmitted to the rear wheels; and
a pressing mechanism which presses the clutch by transforming a part of the torque transmitted to the rear wheels into axial thrust against the clutch, wherein the pressing mechanism includes a first cam, a second cam, and spherical cam followers interposed between the first cam and the second cam, the first cam and the second cam rotate relative to each other, and the cam followers roll on cam surfaces of the first cam and the second cam by the relative rotation, whereby the axial thrust is produced, and
wherein in the driving force transmission system, gear ratios of the plurality of gear mechanisms are set to prevent reversal of a direction of a differential rotation between a first drive shaft connected to an input side of the clutch and a second drive shaft connected to an output side of the clutch even when a steered angle of the front wheels changes to a maximum value while the four-wheel drive vehicle is traveling forwards.

* * * * *